United States Patent
Lesage (12) 
(10) Patent No.: US 7,234,511 B1
(45) Date of Patent: Jun. 26, 2007

(54) MODULAR HEAT EXCHANGER HAVING A BRAZED CORE AND METHOD FOR FORMING

(76) Inventor: Philip George Lesage, R.R. #1, Palgrave, Ontario (CA) L0N 1P0

( * ) Notice: Subject to any disclaimer, the term of this patent is extended or adjusted under 35 U.S.C. 154(b) by 612 days.

(21) Appl. No.: 08/489,795

(22) Filed: Jun. 13, 1995

(51) Int. Cl.
*F28F 9/04* (2006.01)

(52) U.S. Cl. .......................... 165/69; 165/76; 165/149; 165/178

(58) Field of Classification Search ............... 165/173, 165/175, 153, 151, 149, 69, 76; 29/890.03, 29/890.054; 228/223, 224, 183
See application file for complete search history.

(56) References Cited

U.S. PATENT DOCUMENTS

| | | | | |
|---|---|---|---|---|
| 1,834,001 A | * | 12/1931 | Modine ....................... | 165/149 |
| 2,056,318 A | * | 10/1936 | Hammond .................. | 165/149 |
| 2,260,638 A | | 10/1941 | Pfost ........................... | 257/129 |
| 2,327,491 A | | 8/1943 | Blais ........................... | 257/128 |
| 2,505,790 A | * | 5/1950 | Panthofer ................... | 165/149 |
| 3,045,979 A | * | 7/1962 | Huggins et al. ..... | 29/890.03 X |
| 3,635,283 A | * | 1/1972 | Satchwell .................... | 165/37 |
| 3,739,840 A | | 6/1973 | Jones .......................... | 165/69 |
| 3,805,889 A | * | 4/1974 | Coolidge .................... | 165/153 |
| 4,036,288 A | * | 7/1977 | Neveux ....................... | 165/69 |
| 4,041,594 A | * | 8/1977 | Chartet .................. | 165/153 X |
| 4,137,982 A | * | 2/1979 | Crews et al. ........... | 165/149 X |
| 4,159,035 A | * | 6/1979 | Chartet .................... | 165/76 X |
| 4,191,244 A | * | 3/1980 | Keske .................. | 29/890.03 X |
| 4,274,483 A | * | 6/1981 | Cottone et al. ............. | 165/153 |
| 4,327,800 A | * | 5/1982 | Miller ..................... | 228/183 X |
| 4,367,793 A | * | 1/1983 | MacIntosh .................. | 165/151 |
| 4,369,837 A | * | 1/1983 | Moranne .................... | 165/175 |
| 4,398,332 A | * | 8/1983 | Rhodes .................. | 165/149 X |
| 4,401,157 A | | 8/1983 | Cadars ........................ | 165/173 |
| 4,741,392 A | | 5/1988 | Morse .......................... | 165/76 |
| 4,754,913 A | * | 7/1988 | Espedal et al. ............. | 228/183 |
| 4,756,361 A | | 7/1988 | Lesage ........................ | 165/149 |
| 4,763,723 A | * | 8/1988 | Granetzke .................... | 165/67 |

(Continued)

FOREIGN PATENT DOCUMENTS

| | | | | | |
|---|---|---|---|---|---|
| GB | | 2263163 | * | 7/1993 | ............ 29/890.054 |

(Continued)

*Primary Examiner*—Allen J. Flanigan
(74) *Attorney, Agent, or Firm*—Gary M. Hartman; Domenica N. S. Hartman; Hartman & Hartman, P.C.

(57) ABSTRACT

An improved modular heat exchanger suitable for automotive applications, and particularly radiators for heavy duty equipment, and methods for forming the modular heat exchanger. The modular heat exchanger construction incorporates a brazed core assembly composed of flat-type cooling tubes and sinusoidal centers. The ability to use a brazed core assembly within a modular heat exchanger construction promotes enhanced heat transfer efficiencies associated with the use of flat tubes and sinusoidal centers, as compared to mechanically-joined round tubes and fins. The required positional tolerances of the tubes for mating with the remainder of the heat exchanger are maintained within the brazed core assembly by eliminating core shrinkage attributable to the use of clad aluminum alloy components to construct the core assembly. In two embodiments, core shrinkage is physical suppressed through the use of an expandable brazing fixture or the inclusion of sub-headers in the brazed core assembly. In a third embodiment, a clad slurry containing a braze alloy is deposited prior to brazing on a core assembly composed of unclad tubes and centers.

12 Claims, 4 Drawing Sheets

U.S. PATENT DOCUMENTS

| | | | |
|---|---|---|---|
| 4,775,004 A * | 10/1988 | Shiga et al. | 228/183 X |
| 4,908,184 A * | 3/1990 | Kaifu et al. | 420/534 |
| 5,009,262 A | 4/1991 | Halstead et al. | 165/140 |
| 5,052,475 A | 10/1991 | Grundy | 165/76 |
| 5,102,032 A * | 4/1992 | Cottone et al. | 228/223 X |
| 5,123,482 A * | 6/1992 | Abraham | 165/173 |
| 5,195,579 A * | 3/1993 | Buchanan | 165/173 X |
| 5,205,354 A | 4/1993 | Lesage | 165/173 |
| 5,226,235 A | 7/1993 | Lesage | 29/890.047 |
| 5,257,662 A * | 11/1993 | Osborn | 165/173 |
| 5,289,870 A | 3/1994 | Dierbeck | 165/76 |
| 5,303,770 A | 4/1994 | Dierbeck | 165/140 |
| 5,327,959 A * | 7/1994 | Saperstein et al. | 165/173 |
| 5,431,218 A * | 7/1995 | Lelievre | 165/173 |
| 5,538,079 A * | 7/1996 | Pawlick | 165/153 |

FOREIGN PATENT DOCUMENTS

| | | | | |
|---|---|---|---|---|
| JP | 0120474 | * | 9/1980 | 228/183 |
| JP | 0022870 | * | 2/1982 | 228/183 |
| JP | 0192873 | * | 7/1990 | 228/183 |
| JP | 03114662 A | * | 5/1991 | |

* cited by examiner

MODULAR HEAT EXCHANGER HAVING A BRAZED CORE AND METHOD FOR FORMING

BACKGROUND OF THE INVENTION

1. Field of the Invention

The present invention relates to an improved modular heat exchanger of the type used in the automotive industry. More particularly, this invention relates to a modular heat exchanger having a brazed core assembly and techniques by which such a heat exchanger is assembled, in which the brazed core is manufactured such that the spacial positions of its cooling tubes after brazing enable the tubes to properly mate with elastomerically-sealed apertures formed in the heat exchanger's headers, and thereby form a modular heat exchanger whose brazed core can be readily removed for repair or replacement, and whose overall construction is capable of withstanding structural distortions without leaks and structural failures occurring between the tubes and the headers.

2. Description of the Prior Art

Heat exchangers are routinely employed within the automotive industry, such as in the form of radiators for cooling engine coolant, oil coolers, charge air coolers, condensers and evaporators for air conditioning systems, and heaters. In order to efficiently maximize the amount of surface area available for transferring heat between the environment and a fluid flowing through the heat exchanger, the design of the heat exchanger is often of a brazed tube-and-fin type, such as the tube-and-center construction illustrated in FIG. 1a. A portion of a heat exchanger 10 is shown as having a number of flat-type cooling tubes 12 between pairs of high surface area fins, or centers 14. The centers 14 enhance the ability of the heat exchanger 10 to transfer heat from the fluid flowing through the tubes 12 to the environment, or vice versa as the case may be. The tubes 12 are simultaneously brazed to the centers 14 and a manifold (not shown) to form a monolithic brazed construction defining a fluid circuit.

For reasons of weight and durability, the automotive heat exchanger industry has gradually converted to an aluminum alloy construction. The tubes and centers of such heat exchangers are conventionally formed from an aluminum alloy that is clad with an aluminum-silicon eutectic brazing alloy, such as AA 4045, AA 4047 and AA 4343 aluminum alloys (AA being the designation given by the Aluminum Association), or another suitable brazing alloy, including zinc-base cladding alloys. Such braze alloys have a lower melting temperature than the base aluminum alloy, which is often AA 3003, having a nominal chemistry of about 1.2 weight percent manganese, with the balance being substantially aluminum. The cladding is formed to provide a sufficient amount of braze alloy to produce fluid-tight brazements when the assembled components are heated to a temperature above the melting temperature of the cladding, but below the melting temperature of the base aluminum alloy. Aluminum heat exchanger tubes are generally seamless extruded tubes, preformed welded tubes, or formed from welded strips of aluminum flat stock, with one or both sides of the tube being clad.

While the above-described brazed tube-and-center construction is widely employed in the automotive industry for the manufacture of heat exchangers, certain disadvantages exist. One drawback is that the monolithic brazed construction requires a large drying oven and furnace, both of which are expensive to purchase and operate. Another drawback is that the brazed construction renders such heat exchangers inadequate for more physically demanding applications, such as in the truck and heavy-duty equipment industries. More specifically, monolithic brazed heat exchangers are rigid and therefore do not readily "give" during pressure and thermal cycles, when subject to vibration, or when otherwise distorted by their operating environment. For example, radiators used in large trucks and other large equipment typically have frame mountings that tend to distort the radiator into a parallelogram shape when the vehicle is moving over an uneven surface and when sufficient engine torque is generated. As a result, if a monolithic brazed heat exchanger is used in these applications, cracks eventually develop in the tube-to-header joint where the tubes are brazed to the manifold. Repair of cracks in the tube-to-header joint is expensive, and this mode of failure constitutes a major source of scrappage in the heat exchanger industry. Finally, the working environment of a heavy-duty vehicle employed in construction is severe, leading to a high incidence of damage to the tubes and fins from impacts by debris. Consequently, any localized damage to the core of a monolithic brazed heat exchanger will generally necessitate the removal of the entire heat exchanger for repair or replacement.

The above shortcomings are generally known in the prior art. The response in the heavy duty truck and equipment industries has been to employ a modular heat exchanger construction, such as those represented by U.S. Pat. No. 4,191,244 to Keske, U.S. Pat. No. 4,741,392 to Morse, and U.S. Pat. Nos. 5,289,870 and 5,303,770 to Dierbeck. Such designs employ a modular radiator construction composed of a core and header permanently attached to a manifold or tank. One or more of these self-contained heat exchanger units are then assembled to a common header or tank with the use of grommets, gaskets or other resilient sealing material to form a fluid-tight seal between the module and the common header or tank. Notable examples of grommet designs are taught in U.S. Pat. Nos. 4,756,361, 5,205,354 and 5,226,235 to Lesage, commonly assigned with the present invention.

Prior art modular constructions of the type noted above have found wide use because they are more durable and permit replacement of a damaged heat exchanger module without requiring replacement of the entire heat exchanger assembly. However, prior art modular constructions have been generally unable to adopt the brazed tube-and-center core design described previously, in which the tubes and/or fins are formed from a clad aluminum alloy. During brazing, the core module—composed of the tubes and centers—shrinks as the cladding melts and later resolidifies. This tendency is exacerbated if sinusoidal centers are used, such as those shown in FIG. 1a. As a result, assembling a header or tank to the brazed core is impossible because the tubes are misaligned with apertures formed in the header or tank to receive the tubes.

Consequently, prior art modular heat exchanger designs have been assembled with one or more self-contained heat exchanger modules each formed with a common inlet and outlet, as typified by Keske, Morse and Dierbeck. While such an approach may solve the misalignment problem noted above, the result is a module that is nearly as expensive to manufacture as a conventional monolithic brazed heat exchanger. As a more economical alternative, prior art modular heat exchanger have employed cores with a tube and fin construction such as that illustrated in FIG. 1b. With such designs, round tubes 16 and flat fins 18 are mechanically joined together, such as by expanding the tubes 16, as typified by the patents to Lesage. Unfortunately, mechanical joining methods do not yield a metal-to-metal joint that conducts heat as well as the brazed joints formed with the brazed core design illustrated in FIG. 1a. As a result, heat transfer between the fluid in the tubes 16 and air flowing over the fins 18 is not as efficient in prior art modular constructions as compared to monolithic brazed constructions.

From the above, it is apparent that the prior art is lacking an economical modular heat exchanger design that incorporates a brazed core assembly, and further lacks a method or process by which such a heat exchanger could be manufactured. Yet it is also apparent that it would be desirable to provide a heat exchanger that offers the weight and durability benefits of an aluminum alloy construction, the heat transfer efficiency of a brazed tube-and-center core construction, and an economical modular construction that enables a heat exchanger core to be removed and replaced as necessary. Such a modular construction would preferably incorporate a flexible seal between the heat exchanger core and manifold, enabling distortions to occur in the heat exchanger without the occurrence of failures at the tube-to-header joint.

SUMMARY OF THE INVENTION

It is an object of this invention to provide a modular heat exchanger composed of one or more brazed core assemblies, such that the heat exchanger is characterized by a greater heat transfer efficiency than prior art modular heat exchangers having one or more cores constructed of mechanically joined tubes and fins.

It is a further object of this invention to provide a method that enables the manufacture of a brazed core whose dimensions remain stable during brazing or are substantially re-established after brazing so as to permit assembly of the core with one or more manifolds having apertures formed therein for receiving the tubes of the brazed core.

It is another object of this invention that such a method employs a resilient tube-to-header seal that permits distortion of the heat exchanger, thereby yielding a more durable construction.

According to a preferred embodiment of this invention, these and other objects and advantages are accomplished as follows.

According to the present invention, an improved modular heat exchanger is provided, and particularly a modular heat exchanger of the type employed in trucks and other heavy-duty equipment. More specifically, the modular heat exchanger of this invention is composed of one or more brazed cores, so as to be characterized by a high heat transfer efficiency as compared to prior art modular heat exchangers formed with mechanically-joined tubes and fins. The invention further entails several alternative methods by which the occurrence of core shrinkage is averted during the brazing operation, which would otherwise prevent the assembly of the brazed core with a heat exchanger manifold. In one embodiment, the invention utilizes a clad slurry composition that eliminates the requirement for clad tubes and fins, and therefore averts the occurrence of core shrinkage during brazing caused when the cladding melts. In other embodiments, the braze operation is conducted with spacing members that physically immobilize the ends of the cooling tubes, or with a brazing fixture that enables the desired spacial positioning of the tubes to be re-established at the completion of the braze operation. As a result, a brazed core can be installed and removed from the heat exchanger as a module, thereby greatly enhancing the serviceability of the heat exchanger.

Furthermore, the method preferably employs resilient grommets that form a flexible tube-to-header joint, permitting the heat exchanger to withstand a significant degree of distortion without damaging the heat exchanger or creating leaks at the tube-to-header joint.

According to one assembly method of this invention, a core is assembled with unclad aluminum alloy tubes separated by unclad aluminum alloy centers, in which the tubes are exclusively spaced apart by the centers so to establish a tube spacing pattern. Also formed is a header member, which may be a discrete member that is brazed, welded or otherwise an attached part of a manifold or tank assembly, or an integral portion of a manifold or tank. The header member is formed to include apertures that are spaced apart so as to correspond to the tube spacing pattern of the core. As a result, the tubes are assemblable with the apertures upon mating of the core with the header member. A clad slurry composition is then deposited on the core, and the core is brazed such that core shrinkage is sufficiently suppressed so as to enable assembly of the tubes with the apertures of the header member. Prior to assembly with the core, grommets are provided in each aperture of the header member, such that during assembly, an end of each tube is received in a corresponding one of the apertures, and the grommets form a seal between the tubes and the header member. The above steps yield a modular heat exchanger assembly in which the core forms a readily removable module of the heat exchanger.

According to another assembly method of this invention, a core is assembled with aluminum alloy tubes exclusively spaced apart by aluminum alloy centers, either or both of which are clad, in which the centers may be welded to their respective tubes. The tubes and centers are then fixtured so as to establish a tube spacing pattern prior to brazing. A header member, as defined above, is also formed having apertures that are spaced apart so as to correspond to the tube spacing pattern of the fixtured core. The fixture employed is expandable, thereby allowing the core to expand due to thermal expansion, and later shrink during cooling to enable the tube spacing to be re-established. Again, the above steps yield a modular heat exchanger assembly in which the core forms a removable module of the heat exchanger.

Yet another assembly method of this invention is to assemble a core with aluminum alloy tubes and aluminum alloy centers, either or both of which are clad, and one or more spacing members that serve to establish and maintain a desired tube spacing pattern throughout the brazing operation. The result is again a modular heat exchanger assembly in which the core forms a removable module of a heat exchanger.

As can be appreciated from the above, an advantage of the present invention is that practicable methods are provided for manufacturing a modular heat exchanger that utilizes a brazed core construction. As a result, a heat exchanger is provided that incorporates the advantages of both a modular design and a brazed core construction. For example, the brazed core construction yields an enhanced heat transfer efficiency attributable to a brazed tube-to-fin joint. Consequently, a heat exchanger manufactured according to this invention can be employed in place of a larger prior art heat exchanger employing mechanically-joined tubes and fins. In addition, brazed cores manufactured according to this invention require smaller drying ovens and brazing furnaces than monolithic brazed heat exchangers of the prior art, since the brazed core is significantly smaller than the assembled heat exchanger unit.

Advantages of this invention associated with its modular construction include a heat exchanger that is more durable for heavy-duty applications than heat exchangers having a monolithic brazed construction. For example, the use of a modular brazed core whose individual tubes are resiliently mounted to and sealed with the header members of a heat exchanger permits greater flexing without creating a leak path at the tube-to-header joint. Furthermore, the modular construction enables replacement of a damaged brazed core without necessitating replacement or scrappage of the entire unit, such that downtime for the equipment is significantly reduced. Instead, the unit can be readily dismantled, rebuilt and returned to service when needed.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENT

Figures 1A, 1B, 2:
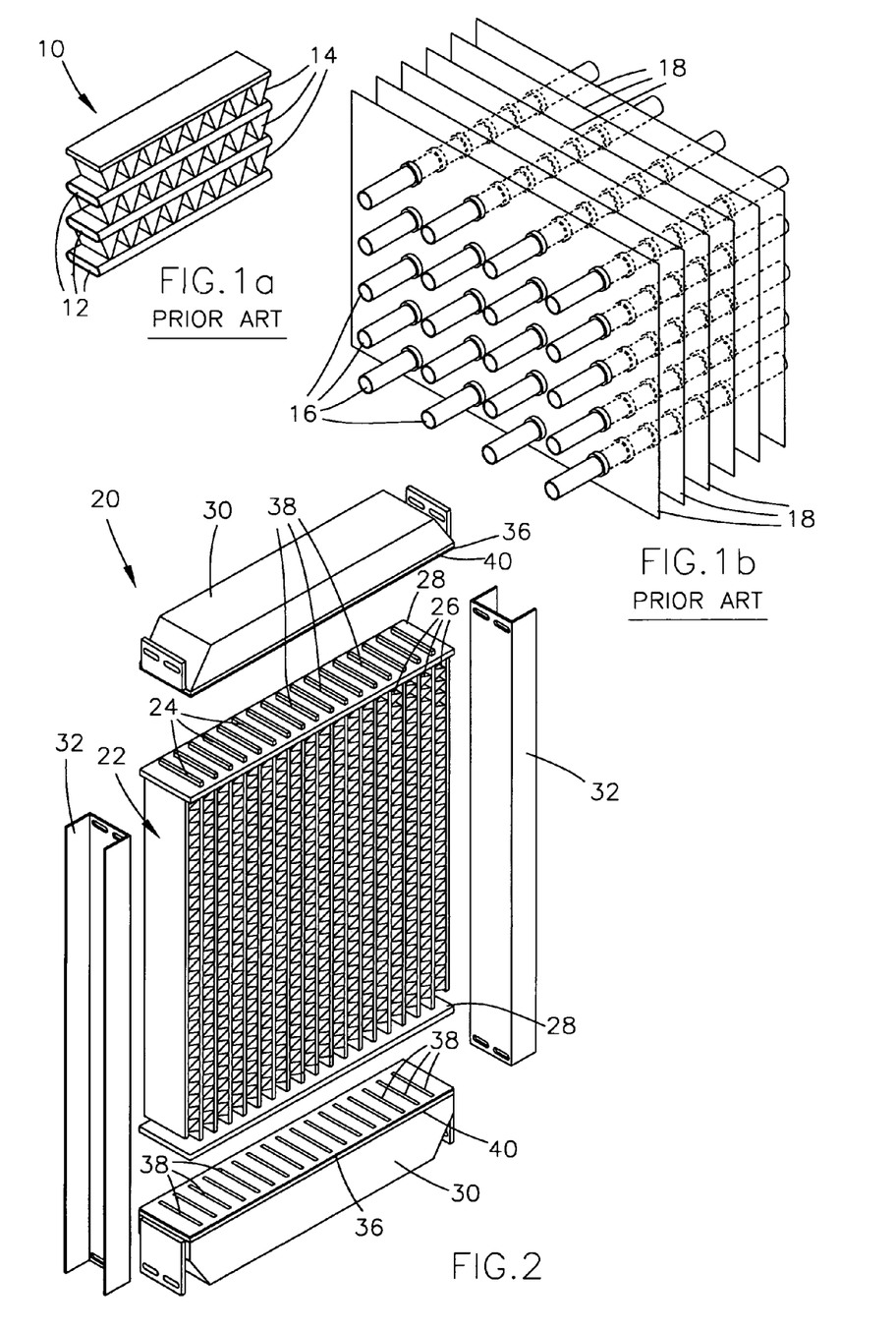
FIGS. 1a and 1b represent portions of prior art heat exchanger cores have a brazed tube-and-center construction and a mechanically-joined tube-and-fin construction, respectively.
FIG. 2 is a perspective exploded view of a modular heat exchanger having a brazed core and sub-header assembly in accordance with one embodiment of this invention.

An improved modular heat exchanger is provided that is suitable for automotive applications, and particularly radiators for heavy duty equipment. FIG. 2 represents a heat exchanger 20 that incorporates the teachings of this invention, and includes a brazed core assembly 22 preferably composed of flat-type cooling tubes 24 and sinusoidal centers 26. The inclusion of a brazed core assembly 22 in the heat exchanger 20 of this invention represents a significant improvement over prior art modular heat exchangers because of enhanced heat transfer efficiencies associated with the use of flat tubes 24, sinusoidal centers 26, and a tube-to-center braze joint. While prior art modular heat exchangers have often required the use of mechanically-joined round tubes and fins in order to maintain positional tolerances for the tubes, the brazed core assembly 22 of this invention is brazed in a manner that avoids core shrinkage and therefore maintains the required positional tolerances for mating the core assembly 22 with the remainder of the heat exchanger 20.

The core assembly 22 shown in FIG. 2 generally has a similar construction to that shown in FIG. 1a. Air is forced around the high surface area provided by the centers 26 located between adjacent pairs of tubes 24, providing for a high heat exchange rate between the air and a fluid flowing through the tubes 24. The tubes 24 are oriented to be geometrically in parallel with each other as well as hydraulically in parallel between a pair of manifolds 30. As shown, the tubes 24 have a flat cross-sectional shape that promotes heat transfer from the coolant to the centers 26. The tube-and-center design illustrated in FIG. 2 is preferred because the design maximizes the amount of surface area that is in contact with incoming air. The tubes 24 can be any one of several known configurations, including welded or extruded, with or without an internal turbulator or internal fins. The tubes 24 could also be round instead of the flat-type configuration shown. Furthermore, the centers 26 could be louvered in combination with the sinusoidal configuration shown in the Figures. A preferred embodiment employs sinusoidal centers 26 with a large bend radius, preferably on the order of about 0.1 to about 0.5 of the center's height (peak to opposite peak of adjacent bends).

Figure 9:
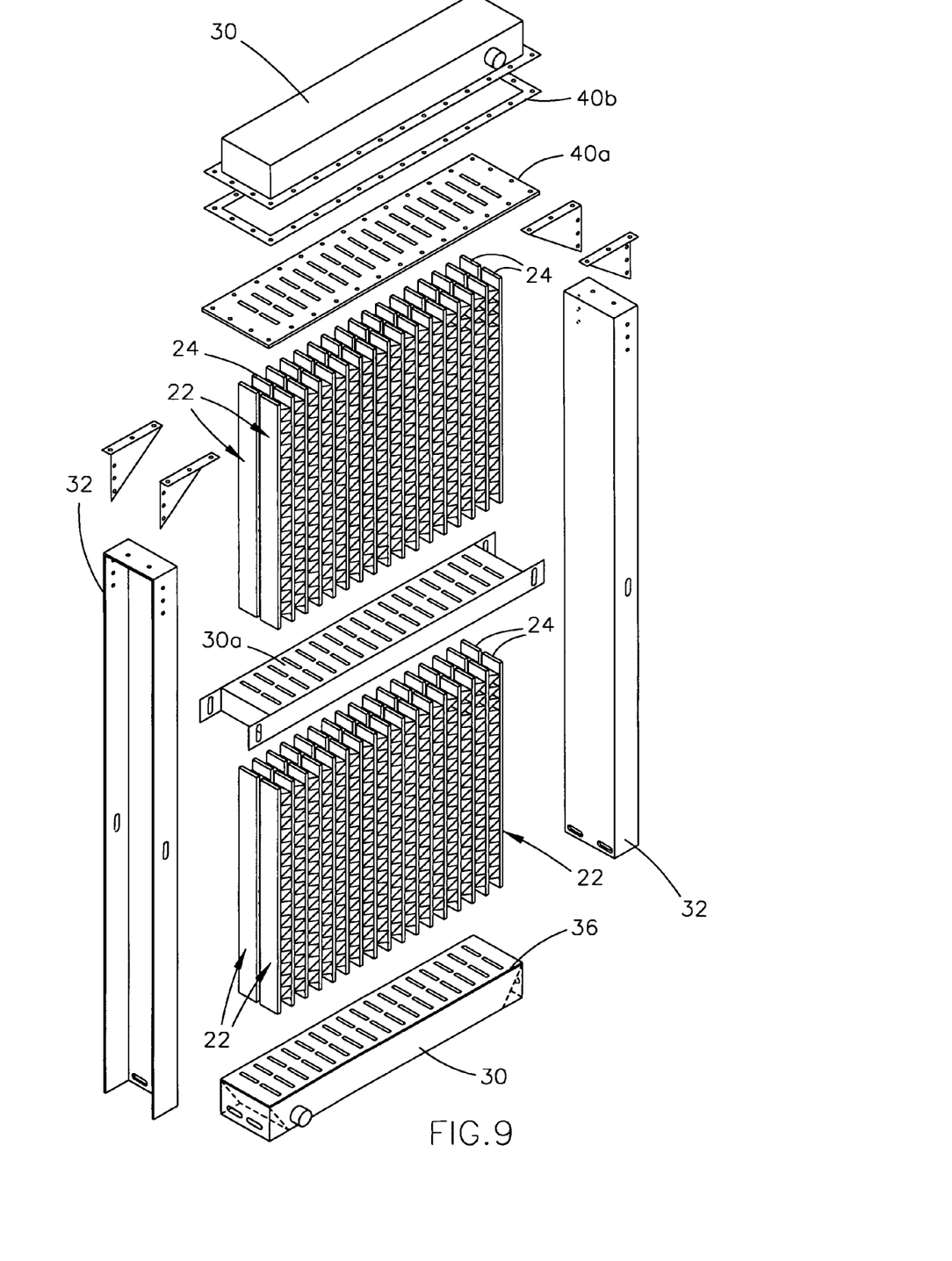
FIG. 9 is a perspective exploded view of a modular heat exchanger having a brazed core in accordance with a second embodiment of this invention.

The manifold design illustrated in FIG. 2 is merely one of numerous designs that could be employed within the teachings of this invention. As used herein, a manifold includes a header that may be a discrete member brazed or welded to the remainder of the manifold assembly, as shown in FIG. 2 in which the manifold 30 is constructed of a tank and a header plate 40. Alternatively, the header could be mechanically fastened to the manifold assembly (as shown in FIG. 9), or an integrally-formed portion of a monolithic manifold design, as is also known in the art.

As illustrated in FIG. 2, the remaining components of the heat exchanger 20 include upper and lower sub-headers 28, side supports 32 and grommets 36. In accordance with one embodiment of this invention, the heat exchanger 20 requires the sub-headers 28 to be an integral brazed part of the core 22 in order to achieve proper alignment of the tubes 24, as will be discussed further below. The side supports 32 are preferably assembled to the manifolds 30 with fasteners (not shown) for the purpose of securing the manifolds 30 to the core assembly 22, yielding a structure that can be readily disassembled for repair or replacement of the core assembly 22.

Figure 3:
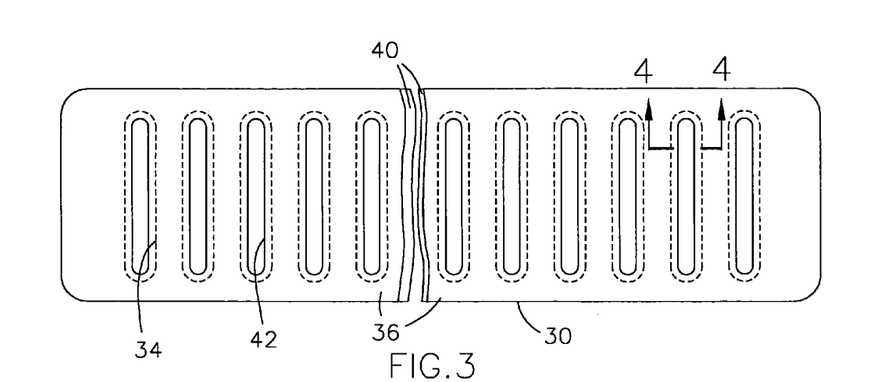
FIG. 3 is a plan view of the header-to-tube joint of the modular heat exchanger shown in FIG. 2.
Figures 4, 5, 6, 7:
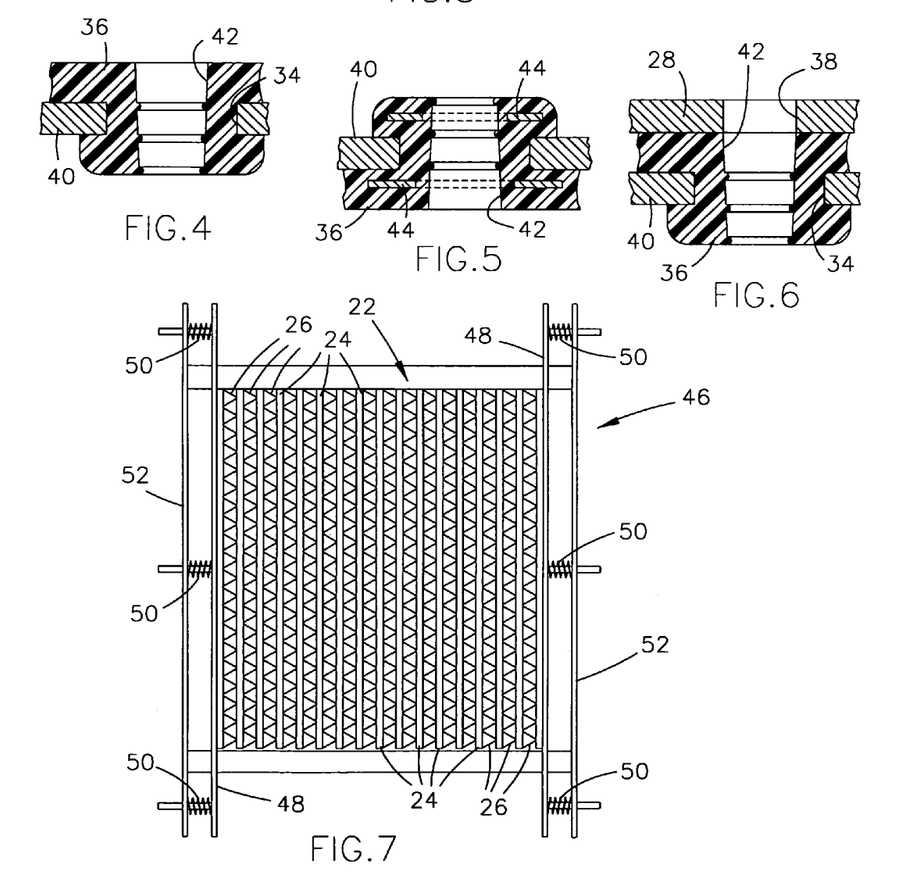
FIGS. 4 through 6 show in cross-section three embodiments for the header-to-tube joint of FIG. 3.
FIG. 7 represents a spring-biased core fixture used in accordance with a second embodiment of this invention and capable of re-establishing a desired tube spacing after brazing.

FIG. 3 is a plan view of the header side of one of the manifolds 30 shown in FIG. 2, in which the header portion, here shown as a header plate 40, is visible through a cut-away of the grommet 36. Accordingly, the illustrated portion of the manifold 30 faces the core assembly 22, and the header plate 40 includes apertures or slots 34 for receiving the ends of the tubes 24 of the core assembly 22. The slots 34 are preferably punched into the headers plates 40 prior to their assembly with their corresponding tank members to form the manifolds 30. A particularly suitable method for carrying out the above is taught in U.S. Pat. No. 5,226,235 to Lesage. As shown in FIGS. 4 through 6, the slots 34 also accommodate projecting portions of the grommets 36. As is known in the art, the thickness of the header plates 40 and the size of the slots 34 must be capable of sufficiently compressing the grommets 36 while minimizing the likelihood of cutting the grommets 36 in order to yield a leak-free tube-to-header seal.

In order to form a resilient and durable seal between the tubes 24 and the header plates 40, the grommets 36 are preferably formed from an elastomeric material, such as silicone, natural rubber, or VITON, a trademark for fluoroelastomers available from Du Pont de Nemours, E.I. & Company. Openings 42 are formed in the grommets 36 to receive each of the tubes 24 of the core assembly 22. In conjunction with the slots 34 in the header plates 40, the openings 42 must also be sized to achieve adequate compression to form a leak-free tube-to-header seal. As shown in FIGS. 2 and 3, each grommet 36 can be formed as a unitary sheet or strip that completely overlays its respective header plate 40. Alternatively, each slot 34 of the header plates 40 can be equipped with an individual grommet. FIG. 4 represents in cross-section the appearance of the header plate 40 and the strip grommet 36 shown in FIG. 4. FIG. 5 illustrates an alternative embodiment for the grommet 36 in which rigid reinforcements 44, such as a metal or plastic rings, are in-molded in the grommet 36 to enhance its high-pressure sealing capability.

The header plates 40 illustrated in the Figures will generally have a typical thickness of about three millimeters (about 0.125 inch). For less demanding applications, the header plates 40 could be formed from a much thinner material than that illustrated—for example, on the order of about 0.5 to about 1.5 millimeters (about 0.025 to about 0.060 inch). The slot 34 for such a header plate would preferably be formed by a drawing operation so that an annular collar is formed having a height approximately equal to the thickness of the header plates 40 shown in the Figures, so as to achieve adequate compression as well as minimize the likelihood of cutting the grommets 36. Such an approach not only reduces the weight of the modular heat exchanger 20 of this invention, but also permits re-coring of existing radiators with the brazed core assembly 22 of this invention.

FIG. 6 represents the appearance of the header plate 40 and grommet 36 in combination with the sub-header 28 shown in FIG. 2. As noted above, one embodiment for the heat exchanger 20 of this invention requires the sub-headers 28 in order to achieve proper alignment of the tubes 24. As shown in FIGS. 2 and 6, the sub-headers 28 are also equipped with slots 38 to receive the ends of the tubes 24, in conjunction with the openings 42 in the grommets 36 and the slots 34 in the header plates 40. According to this invention, the sub-headers 28 are installed as part of the core assembly prior to brazing, and become an integral part of the brazed core assembly 22. As a result, the sub-headers 28 serve as a permanent and integral alignment fixture during the braze cycle, and therefore achieve and maintain a precise tube spacing throughout the brazing operation employed to produce the brazed core assembly 22, even though core shrinkage will occur due to melting of a cladding layer on the tubes 24 and/or centers 26.

An additional benefit is that the sub-headers 28 can be employed to attach the brazed core assembly 22 to the manifolds 30 for high pressure applications, such as oil coolers. As shown in FIG. 6, a portion of each grommet 36 is sandwiched between the header plate 40 and the sub-header 28. By securing the sub-header 28 to the header plate 40, the sub-header 28 serves as a rigid backup that reduces the likelihood of the grommet 36 rupturing or extruding when subject to high pressures. An alternative to the sub-headers 28 is to employ individual bars (not shown), such as carbon spacers installed between the ends of adjacent tubes 24 to achieve and maintain a precise tube spacing during the brazing operation, and then later removed after brazing.

According to this invention, the sub-headers 28 restrict relative movement of the ends of the tubes 24, such that the tube spacing for the brazed core assembly 22 will correspond to that of the header plates 40, even if clad tubes 24 and/or centers 26 are used in the construction of the core assembly 22. Because only the ends of the tubes 24 are restricted, the brazed core assembly 22 formed with clad tubes 24 or centers 26 will acquire a measurable though generally unnoticeable hour glass shape when the body of the core assembly 22 shrinks as the cladding on the tubes 24 and/or centers 26 melts. Surprisingly, unimpeded shrinkage of the remainder of the core assembly 22 has negligible effect on tube spacing at the tube ends, such that assembly of the brazed core assembly 22 with the manifolds 30 has been possible under large-scale manufacturing conditions.

While the sub-headers 28 (or other suitable spacing bars or members) are necessary to achieve and maintain proper tube spacing in accordance with the above-described embodiment of this invention, the sub-headers 28 are not necessary with other manufacturing methods of this invention. One such method entails the use of a spring-biased fixture 46, shown in FIG. 7, to fixture the core assembly 22 prior to brazing. The fixture 46 is composed of a pair of movable members 48 biased toward each other with springs 50 or other suitable biasing or load-generating devices, which permit the movable portion 48 of the fixture 46 to be displaced relative to a fixed main frame 52 of the fixture 46. The ability of the movable members 48 to be displaced within the fixture 46 permits the core assembly 22, when fixtured between the movable members 48, to be stacked in an oversize condition and then expand during the brazing operation as a result of thermal expansion of the tubes 24 and centers 26. For example, the centers 26 can be made slightly oversize (e.g., 25 to 50 micrometers additional fin height) to compensate for clad melting and fin softening during brazing. The fixture 46 is able to accommodate the oversized condition of the core assembly 22, and maintain pressure on the assembly 22 throughout the braze cycle to assure sufficient tube to center contact. Because the core assembly 22 is permitted to expand, the tubes 24 and centers 26 are not compressed together as they thermally expand, and therefore have a substantially reduced tendency for shrinkage during the braze operation as the cladding melts on the tubes 24 and/or centers 26. As a result, this embodiment yields a core 22 formed by tubes 24 that are exclusively spaced apart by centers 26 (as shown in FIGS. 7 and 9). If the sub-headers 28 are part of the core assembly 22, as shown in FIG. 2, the core assembly 22 is further compressed by the fixture 46 to allow installation of the manifolds 30, resulting in a slightly convex shape to the core assembly 22. Notably, the approach of this embodiment is contrary to prior art practices, which employ rigid fixtures in order to securely hold the tubes 24 and centers 26 in position throughout the braze cycle.

The manufacturing process for the above-described embodiments of the present invention is generally as follows. The core assembly 22 can be produced simultaneously with the fabrication or forming of the manifolds 30. The modular heat exchanger 20 of this invention preferably has an aluminum alloy construction to yield a lower weight and more durable unit, though it is foreseeable that the manifolds 30 could be formed from other suitable materials, such as steel or brass. The aluminum alloy stock used to form the tubes 24 and/or centers 26 of the core assembly 22 can be clad with any suitable braze alloy, as is the conventional practice. The core assembly 22 is assembled by stacking the tubes 24 and centers 26 and then, in accordance with the first embodiment of this invention, fixturing the assembly with the sub-headers 28 for brazing, or in accordance with the second embodiment of this invention, fixturing the assembly with the spring-biased fixture 46 shown in FIG. 7.

According to the above embodiments of this invention, brazements between the tubes 24 and centers 26 are formed by the cladding on the tubes 24 and/or centers 26. As is conventional, a flux compound must be deposited on the fixtured assembly in order to promote a high quality brazement. A preferred flux compound for carrying out the teachings of this invention contains potassium tetrafluoroaluminate (KAlF$_4$), though other flux compounds could foreseeably be used. Prior to brazing, the fixtured and fluxed core assembly 22 will generally require drying at a temperature of about 290° C. to about 315° C. (about 550° F. to about 600° F.) to eliminate any moisture on the surfaces of the assembly 22. Notably, the drying operation can be carried out in a significantly smaller drying oven than those required to dry a monolithic brazed aluminum heat exchanger. The core assembly 22 is then brazed in a controlled atmosphere. A preferred braze atmosphere is nitrogen with a free oxygen level of less than about 100 ppm and a dewpoint of about −40° C. Brazing is preferably carried out at a temperature of about 607° C. to about 615° C. (about 1125° F. to about 1140° F.), which is sufficient to cause the cladding on the tubes 24 and/or centers 26 to melt and join each tube 24 to its adjacent centers 26, and each of the tubes 24 to the sub-headers 28 (if present).

Upon cooling to ambient, the result is a monolithic core assembly 22 that can be assembled to the remaining components of the modular heat exchanger 20. In accordance with the first embodiment of this invention, assembly is made possible because the sub-headers 28 maintain the required tube spacing at the ends of the tubes 24. In accordance with the second embodiment, assembly is made possible because the spring-biased fixture 46 enables the core assembly 22 to freely expand in response to thermal expansion caused by the elevated temperatures of the brazing cycle, such that the tubes 24 and centers 26 are not excessively compacted during the brazing cycle. The fixture 46 also maintains adequate contact between the tubes 24 and centers 26 throughout the braze cycle as the cladding melts, such that high quality brazements are achieved between the tubes 24 and centers 26. Both methods enable the desired tube spacing to be present after the core assembly 22 is cooled to room temperature.

The manifolds 30 also preferable have an aluminum alloy construction, and can be fabricated concurrently with the brazing of the core assembly 22. As previously discussed, the manifolds 30 may be fabricated by welding or brazing the header plates 40 to their respective tank members in any suitable manner. Alternatively, single piece manifolds, each having an integral header portion, can be formed in accordance with known practices. Following fabrication or forming of the manifolds 30, the grommets 36 are inserted into the slots 34 of the header plates 40, as shown in FIG. 3. Afterwards, the manifolds 30 are assembled with the brazed core assembly 22, such that each tube 24 is inserted through a grommet opening 42. During assembly, the sub-headers 28 (if present) become positioned next to the grommets 36, as shown in FIG. 6. The final assembly step is to attach the side supports 32 to the assembly, thereby securing the manifolds 30 to the core assembly 22. The modular heat exchanger 20 can than be tested to ensure a leak-free construction.

In contrast to the embodiments described above, a final embodiment of this invention uses unclad tubes 24 and centers 26 as a solution to the core shrinkage problem addressed by this invention. As before, the core assembly 22 can be produced simultaneously with the fabrication of the manifolds 30. In addition, the modular heat exchanger 20 of this embodiment preferably has an aluminum alloy construction to yield a lower weight and more durable unit. However, in contrast to the previous embodiments, the aluminum alloy stock used to form the core assembly 22 is not clad with a braze alloy, as is the conventional practice. As a result, the core assembly 22 is not susceptible to shrinkage during the brazing operation, such that the positions of the tubes 24 within the core assembly 22 are substantially and exclusively maintained throughout brazing by the centers 26 enabling assembly of the brazed core assembly 22 with manifolds 30 as shown in FIG. 9.

As with the previous embodiments, the core assembly 22 is assembled by stacking the tubes 24 and centers 26, and then fixturing the assembly for brazing, with or without the sub-headers 28. According to this embodiment, brazements between the tubes 24 and centers 26 are formed by depositing a clad slurry that contains a braze alloy powder necessary to melt and form the brazements, and preferably a flux compound necessary to promote a high quality brazement. According to this invention, it has been determined that the use of a braze alloy powder deposited on the core assembly 22 prior to brazing, in lieu of forming the tubes 24 and centers 26 from conventional clad aluminum alloy stock, essentially eliminates core shrinkage during the brazing operation. Consequently, the dimensional spacing established for the tubes 24 prior to brazing is maintained, thereby allowing the brazed core assembly 22 to be assembled with the grommets 36 and manifolds boxes 30.

A preferred clad slurry for carrying out this embodiment is a flux-brazing composition taught in U.S. Pat. No. 5,251,374 to Halstead et al. The flux-brazing composition is composed of a mixture of a flux compound, an aluminum-silicon braze alloy powder and a zinc powder held together with a suitable binder. Preferably, the flux compound is potassium tetrafluoroaluminate (KAlF$_4$). In accordance with Halstead et al., a preferred formulation for the flux-brazing composition contains about 10 to about 50 weight percent of the potassium tetrafluoroaluminate, about 2 to about 13 weight percent silicon, about 0.5 to about 3 weight percent of zinc or another metal whose electrode potential is less than the electrode potential of the tube's aluminum alloy, and about 0.1 to about 2 weight percent of an organic binder, such as hydroxypropyl cellulose binder, with the balance being aluminum particles. The preferred flux-brazing composition is characterized by having a paste-like consistency, so as to be sufficiently viscous to adhere well to the tubes 24 and centers 26, while also being sufficiently fluid so as to promote handling and deposition of the composition. Notably, the flux-brazing composition does not contain water, and therefore does not serve as a source for water that would otherwise adversely affect braze joint quality.

Alternative clad slurries to the preferred flux-brazing composition taught by Halstead et al. could be used. For example, it is foreseeable that a clad slurry composed primarily of a braze alloy powder could be employed under certain circumstances. Furthermore, the braze alloy powder could be other than an aluminum-silicon mixture. For example, it is foreseeable that a zinc-base powder could be employed as a substitute for zinc cladding alloys previously noted. Such alternative compositions are all within the scope of this invention, since the problem solved by this invention can be characterized as the core shrinkage associated with brazed core constructions, and the solution provided by this embodiment can be characterized as the identification of cladding as the source for core shrinkage and the elimination of cladding through the use of a braze alloy powder after the core assembly 22 has been assembled but before the brazing operation.

Prior to brazing, the fixtured core assembly 22 must be dried at a temperature of about 260° C. to about 315° C. (about 500° F. to about 600° F.) to eliminate any moisture on the surfaces of the assembly 22. The drying operation causes the preferred flux-brazing composition to harden and form a highly adherent coating that permits the core assembly 22 to be readily handled without concern for the loss of flux prior to brazing. As noted with the previous embodiments of this invention, the drying operation can be carried out in a significantly smaller drying oven than those required to dry a monolithic brazed aluminum heat exchanger. In addition, the preferred flux-brazing composition eliminates the conventional requirement for a separate dry oven and core fluxer, which would require large, energy intensive facilities in order to accommodate the core assembly 22. Instead, the preferred flux-brazing composition provides both the flux and the braze alloy required for brazing.

The core assembly 22 is then brazed in a controlled atmosphere, in essentially an identical manner to that described for the previous embodiments. Brazing is preferably carried out at a temperature of about 580° C. to about 620° C., which is sufficient to cause the silicon-rich alloy in the flux-brazing composition to melt and join each tube 24 to its adjacent pair of centers 26, and each of the tubes 24 to the sub-headers 28 (if present). Upon cooling to ambient, the result is a monolithic brazed core assembly 22 that can be assembled to the remaining components of the modular heat exchanger 20. As with the previous embodiments, the manifolds 30 can be fabricated or formed concurrently with the brazing of the core assembly 22. Afterwards, the manifolds 30 can be assembled with their grommets 36 to achieve the configuration shown in either FIGS. 4, 5 or 6, and then assembled with the brazed core assembly 22 and the side supports 32.

Figure 8A:
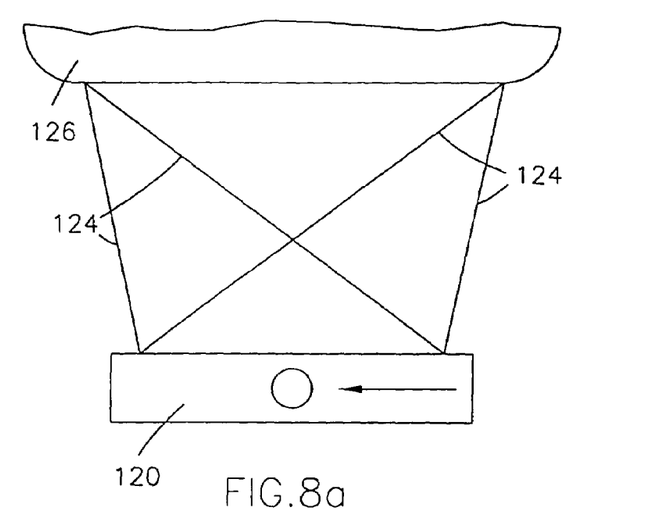
FIGS. 8a and 8b represent the installation of a modular heat exchanger in accordance with the present invention.
Figure 8B:
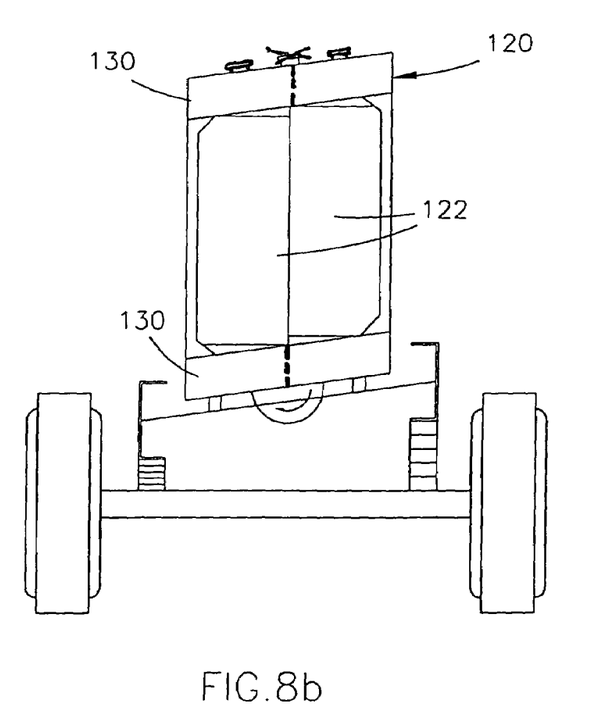

From the above, it can be seen that the assembly and brazing methods of this invention solve the shrinkage problem that has previously prevented the use of a brazed core assembly in a modular heat exchanger design. Specifically, this invention enables the novel construction of a modular heat exchanger with a brazed core assembly and grommets, such that the heat exchanger can be readily disassembled to remove, repair and/or replace the brazed core assembly. Such a capability further enables several small brazed cores to be assembled to a pair of manifolds as shown in FIGS. 8a, 8b and 9. As a result of the smaller core assemblies required to be dried and brazed, smaller drying ovens and braze furnaces can be used, corresponding to lower purchase and operating costs. Because core shrinkage is eliminated or controlled by this invention, the cores can be assembled to fit closely together, giving the appearance of a unitary core assembly.

As illustrated in FIG. 8a, the installation of a modular heat exchanger assembly 120 in a truck or other heavy-duty vehicle typically involves the use of tie rods 124 that stabilize and secure the heat exchanger assembly 120 relative to the firewall 126 of the vehicle. During the vehicle's operation, the tie rods 124 restrict movement of the top of the assembly 120, while the bottom of the assembly 120 is subject to distortion as a result of engine torque, etc., as represented in FIG. 8b. With the use of two or more brazed core modules 122 of the type made possible by this invention, distortion of the heat exchanger assembly 120 does not cause the tube-to-header joints to fracture, but instead permits slippage between the core modules 122, with the grommets 36 maintaining a high-integrity seal between the core modules 122 and the manifolds 130. In effect, the slippage between the core modules 122 acts as a stress reliever for the heat exchanger assembly 120, thus increasing its service life.

A feature of the heat exchanger assembly 120 shown in FIG. 8b is that each core module 122 is used in a separate heat exchanger circuit, but within the single envelope formed by the manifolds 130. Such a capability with a brazed monolithic heat exchanger assembly has not been previously possible, because different operating temperatures for the individual cooling circuits would cause different thermal expansions, leading to stress and/or cyclic failure of the heat exchanger assembly. With the present invention's brazed core assembly within a modular heat exchanger design, different thermal expansions can now be accommodated by the grommets 36.

The modification represented in FIG. 9 illustrates how two or more core assemblies 22 can be stacked on top of each other, with an intermediate manifold 30a being used to separate the adjacent core assemblies 22. This design allows the tubes 24 of the core assemblies 22 to expand in the intermediate manifold 30a during temperature cycling, thereby reducing stress and promoting a longer service life for the modular heat exchanger assembly. This modular design also solves the prior art problem of expensive tooling and equipment to manufacture a large heat exchanger assembly. In addition, FIG. 9 illustrates the ability to construct a modular heat exchanger composed of multiple rows of tubes and centers within each core assembly 22, and the use of a bolt-on header 40a that is mechanically fastened to a corresponding manifold 30, with a gasket 40b being used to seal the header-to-manifold interface. Advantageously, the use of the header 40a shown in FIG. 9 enables existing copper and brass radiator assemblies to be retrofit with the brazed core assemblies 22 of this invention.

From the above, it can be seen that a particularly advantageous feature of this invention is that a practicable method is provided for manufacturing a modular heat exchanger that utilizes a brazed tube-and-center core construction. The previous inability to incorporate a brazed core construction within a fully modular heat exchanger design is solved by this invention through the avoidance or control of core shrinkage during brazing, and through the practice of elastomerically sealing the brazed core(s) with the remainder of the assembly in order to permit removal and/or replacement of one or more of the brazed cores. As a result, a brazed core assembly manufactured according to this invention can be readily assembled with the remaining components of a heat exchanger, with proper tube alignment being achieved.

As such, heat exchangers manufactured in accordance with this invention incorporate advantages of both a modular heat exchanger design and a brazed core construction. For example, the brazed core construction can be produced with flat tubes and sinusoidal centers to yield an enhanced heat transfer efficiency attributable to these tube and fin designs and a brazed tube-to-fin joint. Consequently, a heat exchanger manufactured according to this invention can be employed in place of a larger prior art heat exchanger employing mechanically-joined tubes and fins. Furthermore, brazed cores manufactured according to this invention require smaller drying ovens and brazing furnaces than monolithic brazed heat exchangers of the prior art, since the brazed core is significantly smaller than the final assembled heat exchanger unit.

Advantages of this invention associated with its modular construction include a heat exchanger that is more durable for heavy-duty applications than heat exchangers having a monolithic brazed construction. For example, the use of a modular brazed core resiliently mounted to and elastomerically sealed with the headers of the heat exchanger permits greater flexing without creating a leak path at the tube to header joint. Furthermore, the modular construction enables replacement of a damaged brazed core without necessitating replacement or scrappage of the entire unit, such that downtime for the equipment is significantly reduced. In addition, the modular brazed core assembly of this invention can be retrofit on many existing modular heat exchanger units in the field.

Another advantage of this invention is that the method enables the use of multiple brazed core assemblies within a single heat exchanger. Alternatively, multiple core assemblies can be employed to provide a number of discrete heat exchanger circuits, while sharing common headers and tanks so as to optimize space and simplify installation, as shown in FIG. 8b.

Finally, the strip grommet design of this invention is economical to manufacture and install. An additional benefit is that the strip grommet design provides galvanic insulation between the brazed core assembly and the remainder of the heat exchanger. As such, the manifolds and/or headers can be formed from a metal more noble than the core assembly without promoting corrosion due to galvanic action. For example, the manifolds and headers could be formed from a galvanized steel, while the core assembly is formed from an aluminum alloy. The use of a stronger material for the manifolds and headers allows for greater latitude in the design of these components. The strip grommet design is also compatible with oval and rectangular manifold designs known in the prior art. As such a manifold distorts to a more circular shape, the strip grommet design of this invention is subjected to greater compression, thereby enhancing the sealing capability of the grommet.

Accordingly, while our invention has been described in terms of a preferred embodiment, it is apparent that other forms could be adopted by one skilled in the art. For example, one or more brazed core assemblies fabricated according to this invention could be utilized in a modular heat exchanger that differs markedly in construction and appearance from those shown in the Figures, other clad slurry composition could be used, and the processing steps could differ from those described. Accordingly, the scope of our invention is to be limited only by the following claims.

The invention claimed is:

1. A modular heat exchanger comprising:
   a headerless brazed tube-and-center core assembly comprising:
      a plurality of longitudinally disposed tubes, each tube of the plurality of longitudinally disposed tubes having oppositely disposed open ends and a substantially oblong cross-section having a planar longer side spaced from the longitudinal axis thereof;
      a plurality of longitudinally disposed cooling fins having oppositely disposed ends, each cooling fin of the plurality of longitudinally disposed cooling fins having an arcuate cross-section along a longitudinal axis parallel to the plurality of longitudinally disposed tubes such that the plurality of longitudinally disposed tubes and the plurality of longitudinally disposed cooling fins define an alternating pattern of tubes and cooling fins in a direction transverse to the longitudinal axes of the tubes and cooling fins;
      wherein the spacing between the longitudinal axes of adjacent pairs of the plurality of longitudinally disposed tubes is a predetermined distance; and
      means for maintaining the predetermined distance between the alternating pattern of tubes and cooling fins during brazing thereof excluding locating plates mounted to the open ends of the plurality of longitudinally disposed tubes, whereby the alternating pattern of tube and cooling fins are brazed with a braze material to define the headerless brazed tube-and-center core assembly of the modular heat exchanger and whereby the headerless brazed tube-and-center core assembly is configured so that immediately on removal from the modular heat exchanger the open ends of the plurality of longitudinally disposed tubes are unrestricted and the predetermined distance is exclusively determined by the cooling fins; and
   a pair of manifolds, each manifold having a header plate, each header plate having apertures provided therein, the apertures of each header plate being spaced apart so as to substantially correspond to the predetermined distance between the alternating pattern of tubes and cooling fins, each aperture having an elastomeric sealing means received therein, each open end of the plurality of longitudinally disposed tubes being removably receivable within a corresponding one of the apertures such that the elastomeric sealing means form fluid-tight seals between the plurality of longitudinally disposed tubes and each of the manifolds; and
   means for mechanically securing the headerless brazed tube-and-center core assembly to and between the pair of manifolds and for retaining the open ends within the apertures of the header plates, the support member being securable to the pair of manifolds such that the headerless brazed tube-and-center core assembly is a removable monolithic brazed module of the modular heat exchanger.

2. A modular heat exchanger as recited in claim 1 wherein the modular heat exchanger comprises a plurality of brazed tube-and-center core assemblies, each of the brazed tube-and-center core assemblies being mechanically secured to and between a pair of manifolds with a support member such that each of the brazed tube-and-center core assemblies is a removable monolithic brazed module of the modular heat exchanger.

3. A modular heat exchanger as recited in claim 1, wherein the header plate of each manifold is metallurgically joined thereto or integrally formed therewith.

4. A modular heat exchanger as recited in claim 1 wherein the open ends of the plurality of longitudinally disposed tubes are defined by portions of the plurality of longitudinally disposed tubes that extend beyond the cooling fins, and the portions of the plurality of longitudinally disposed tubes are exclusively spaced apart by the plurality of longitudinally disposed cooling fins.

5. A modular heat exchanger as recited in claim 1, wherein the maintaining means comprises a fixture that permits the alternating pattern of tubes and cooling fins to expand in response to thermal expansion of the plurality of longitudinally disposed tubes and the plurality of longitudinally disposed cooling fins during brazing such that core shrinkage due to compaction of the alternating pattern of tubes and cooling fins is sufficiently controlled during brazing to obtain the predetermined distance without the use of locating plates mounted to the open ends of the plurality of longitudinally disposed tubes to yield the headerless brazed tube-and-center core assembly.

6. A modular heat exchanger as recited in claim 5, wherein the fixture maintains a compression force on the alternating pattern of tubes and cooling fins throughout brazing so as to maintain contact between the plurality of longitudinally disposed tubes and the plurality of longitudinally disposed cooling fins.

7. A modular heat exchanger as recited in claim 1, wherein the maintaining means comprises a brazing composition providing the braze material for brazing the plurality of longitudinally disposed tubes and the plurality of longitudinally disposed cooling fins.

8. A modular heat exchanger as recited in claim 1, wherein the headerless brazed tube-and-center core assembly consists of the plurality of longitudinally disposed tubes, the plurality of longitudinally disposed cooling fins therebetween, the braze material, and optionally internal fins within the plurality of longitudinally disposed tubes.

9. A modular heat exchanger as recited in claim 1, wherein the plurality of longitudinally disposed tubes are flat aluminum alloy tubes and the plurality of longitudinally disposed cooling fins are sinusoidal aluminum alloy centers.

10. A modular heat exchanger as recited in claim 1, wherein the modular heat exchanger is a charge air cooler.

11. A modular heat exchanger as recited in claim 1, wherein the maintaining means consists of the braze material, the plurality of longitudinally disposed tubes, and the plurality of longitudinally disposed cooling fins.

12. A modular heat exchanger comprising:
a headerless brazed tube-and-center core assembly comprising:
a plurality of longitudinally disposed tubes, each tube of the plurality of longitudinally disposed tubes having oppositely disposed open ends and a substantially oblong cross-section having a planar longer side spaced from the longitudinal axis thereof; and
a plurality of longitudinally disposed cooling fins having oppositely disposed ends, each cooling fin of the plurality of longitudinally disposed cooling fins having an arcuate cross-section along a longitudinal axis parallel to the plurality of longitudinally disposed tubes such that the plurality of longitudinally disposed tubes and the plurality of longitudinally disposed cooling fins define an alternating pattern of tubes and cooling fins in a direction transverse to the longitudinal axes of the tubes and cooling fins;
wherein the spacing between the longitudinal axes of adjacent pairs of the plurality of longitudinally disposed tubes is a predetermined distance;
wherein the alternating pattern of tube and cooling fins are brazed with a braze material to define the headerless brazed tube-and-center core assembly of the modular heat exchanger; and
wherein the headerless brazed tube-and-center core assembly is configured so that immediately on removal from the modular heat exchanger the open ends of the plurality of longitudinally disposed tubes are unrestricted and the predetermined distance is exclusively determined by the cooling fins; and
a pair of manifolds, each manifold having a header plate, each header plate having apertures provided therein, the apertures of each header plate being spaced apart so as to substantially correspond to the predetermined distance between the alternating pattern of tubes and cooling fins, each aperture having an elastomeric sealing means received therein, each open end of the plurality of longitudinally disposed tubes being removably receivable within a corresponding one of the apertures such that the elastomeric sealing means form fluid-tight seals between the plurality of longitudinally disposed tubes and each of the manifolds; and
means for mechanically securing the headerless brazed tube-and-center core assembly to and between the pair of manifolds and for retaining the open ends within the apertures of the header plates, the support member being securable to the pair of manifolds such that the headerless brazed tube-and-center core assembly is a removable monolithic brazed module of the modular heat exchanger.

\* \* \* \* \*